US010560918B1

(12) United States Patent
Lau et al.

(10) Patent No.: US 10,560,918 B1
(45) Date of Patent: Feb. 11, 2020

(54) SYSTEMS AND METHODS FOR A NETWORK PAGING POLICY BASED ON DEVICE MOBILITY CATEGORY

(71) Applicant: Verizon Patent and Licensing Inc., Arlington, VA (US)

(72) Inventors: Priscilla Lau, Concord, CA (US); Suzann Hua, Walnut Creek, CA (US); Brian Olson, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/193,755

(22) Filed: Nov. 16, 2018

(51) Int. Cl.
*H04W 8/14* (2009.01)
*H04W 68/00* (2009.01)
*H04W 8/04* (2009.01)

(52) U.S. Cl.
CPC ........... *H04W 68/005* (2013.01); *H04W 8/04* (2013.01); *H04W 8/14* (2013.01)

(58) Field of Classification Search
CPC .................................................. H04W 68/005
See application file for complete search history.

(56) References Cited

U.S. PATENT DOCUMENTS

2013/0316706 A1* 11/2013 Knauft ................. H04W 68/04
455/435.1
2016/0309448 A1* 10/2016 Truelove ............... H04W 68/04
2017/0311304 A1* 10/2017 Lu ........................... H04W 4/70

* cited by examiner

*Primary Examiner* — Michael T Vu

(57) ABSTRACT

A computer device may include a memory storing instructions and processor configured to execute the instructions to detect a condition to page a user equipment (UE) device, retrieve mobility category information associated with the UE device from a mobility database, and use the retrieved mobility category information to determine a paging policy. The computer device may be further configured to select a number of base station cells to which the computer device is to send a paging message based on the determined paging policy and page the UE device using the selected number of base station cells.

20 Claims, 11 Drawing Sheets

455

| MOBILITY CATEGORY 610 | DESCRIPTION 620 | NUMBER OF CELLS TO PAGE 630 |
|---|---|---|
| MC-1 | STATIONARY | LAST KNOWN CELL |
| MC-2 | HIGH MOBILITY | X NUMBER OF CELLS NEAR LAST KNOWN CELL |
| MC-3 | LOW MOBILITY | Y NUMBER OF CELLS NEAR LAST KNOWN CELL (Y<X) |
| MC-4 | VARIABLE | USE STANDARD PAGING PROCEDURE |

FIG. 6

SYSTEMS AND METHODS FOR A NETWORK PAGING POLICY BASED ON DEVICE MOBILITY CATEGORY

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices with different types of behavior profiles. The different types of behavior profiles may need to be handled differently by a wireless access network. Thus, managing all the different types of behavior profiles poses various challenges.

BRIEF DESCRIPTION OF THE DRAWINGS

FIG. 6 is a diagram illustrating exemplary components of the paging table of FIG. 5 according to an implementation described herein;

DETAILED DESCRIPTION OF PREFERRED EMBODIMENTS

Figure 1:
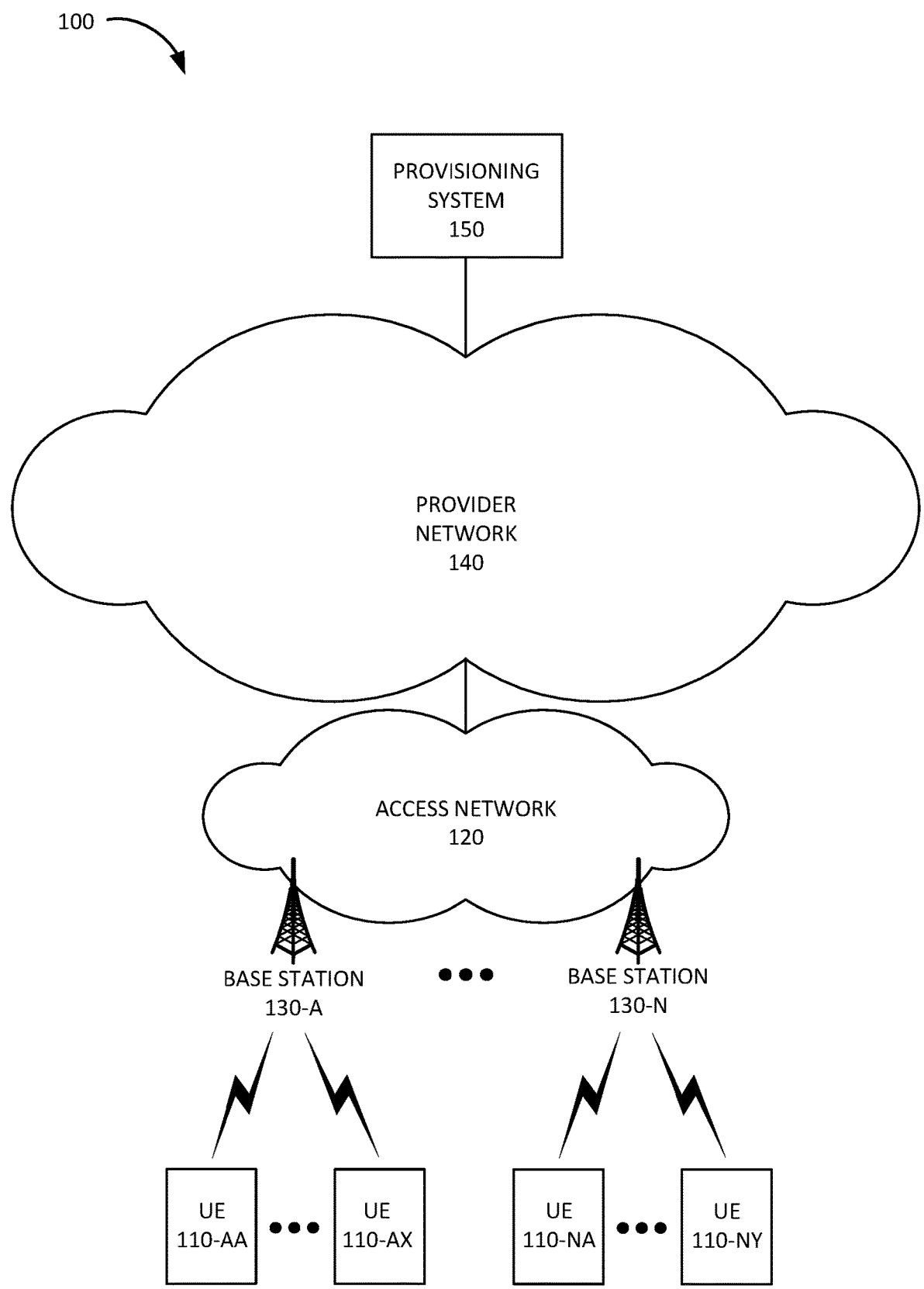
FIG. 1 is a diagram illustrating an environment according to an implementation described herein.

The following detailed description refers to the accompanying drawings. The same reference numbers in different drawings identify the same or similar elements.

While wireless access networks were traditionally designed to support mobile devices, such as smart phones, an increasing number of Internet of Things (IoT) applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary utility meters to high velocity autonomous vehicles and aerial drones.

When a wireless access network needs to contact a user equipment (UE) device that is in idle mode, the wireless access network sends a paging message to the UE device. Thus, the paging message may inform the UE device that the wireless access network has a message, data to be delivered, and/or a request for the UE device. The UE device may detect the paging message, decode the content of the paging message, and initiate an appropriate response to the paging message. In order for a paging message to reach the UE device, the wireless access network may need to send the same paging message to all the base station cells or sectors that include the UE device within their coverage area.

Applying the same network paging efforts for a wide variety of IoT devices, or other types of UE devices, may be an inefficient use of network resources. As an example, a stationary IoT device may not move or change locations in normal situations and thus the wireless access network may only need to page one base station cell. As another example, a high velocity self-driving vehicle may change locations frequently and thus the wireless access network my need to page multiple base station cells to reach the high velocity self-driving vehicle. By reducing the number or only paging the base station cell where the UE device is currently located, (e.g., in the case of a low mobility UE device), the number of paging messages traversing the network may be significantly reduced.

Implementations described herein relate to tailoring a network paging policy for Fourth Generation (4G) Long Term Evolution (LTE) and Fifth Generation (5G) New Radio (NR) wireless access networks based on a UE device mobility category.

A subscriber profile management device may be configured to register a UE device with a subscriber profile management device, receive information identifying a mobility category based on an intended usage of the UE device, and store the received information identifying the mobility category in a subscriber profile associated with the UE device.

A computer device in a wireless access network may be configured to obtain the information identifying the mobility category for the UE device from the subscriber profile management device. In some implementations, the information identifying the mobility category for the UE device may be obtained during an attach procedure for the UE device. In other implementations, the information identifying the mobility category for the UE device may be obtained during a paging procedure. The mobility category information may be stored by the computer device in a mobility database.

The computer device may be configured to detect a condition to page the UE device, retrieve mobility category information associated with the UE device from the mobility database, and use the retrieved mobility category information to determine a paging policy based on a paging table that includes paging policies for particular mobility categories. The computer device may be further configured to select a number of base station cells to which to send a paging message based on the determined paging policy from the paging table and page the UE device using the selected number of base station cells.

As an example, the mobility category information may identify the UE device as belonging to a stationary mobility category, and the computer device may select to page only a last known base station cell servicing the UE device. As another example, the mobility category information may identify the UE device as belonging to a low mobility category, and the computer device may select to page a first number of base station cells around a last known base station cell servicing the UE device. As yet another example, the mobility category information may identify the UE device as belonging to a high mobility category, and the computer device may select to page a second number of base station cells around the last known base station cell servicing the UE device, wherein the second number is higher than the first number. As yet another example, the mobility category information may identify the UE device as belonging to a variable mobility category, and the computer device may select to use a default paging procedure.

In some implementations, the tailoring of the network paging policy based on mobility categories may be implemented in a 4G LTE wireless access network. For example, the computer device may include a Mobility Management Entity (MME) device and the subscriber profile management device may include a Home Subscriber Server (HSS) device. The MME device may obtain the mobility category information from the HSS device via an S6a interface.

In other implementations, the tailoring of the network paging policy based on mobility categories may be implemented in a 5G NR wireless access network. For example, the computer device may include an Access and Mobility Management Function (AMF) device and the subscriber profile management device may include a Unified Data Management (UDM) device. The AMF device may obtain the mobility category information from the UDM device via an N8 interface.

In some implementations, the wireless access network may monitor the mobility of a UE device and compare the actual mobility of the UE device with the intended mobility of the UE device. For example, the computer device may be further configured to monitor the mobility associated with the UE device and generate a mobility index for the UE device based on the monitored mobility. The computer device may then compare the generated mobility index to a mobility category associated with the UE device based on the received mobility category information and generate an alert if the mobility index differs from the mobility category. The alert may be used to manage the UE device. As an example, if the computer device determines that a stationary IoT device has moved, the computer device may generate an alert that indicates a theft of the IoT device, or that indicates the IoT device has been moved to a new location by an administrator of the IoT device. As another example, if the computer device determines that a high mobility aerial drone has been stationary for a particular length of time, the computer device may generate an alert which indicates that the aerial drone has malfunctioned or become entangled in an obstruction. Additionally, in some implementations, if the generated mobility index differs from the mobility category more than a threshold amount of time or instances, or for a significant portion of operating time, the mobility category may be updated based on the mobility index.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), an access network 120, a provider network 140, and a provisioning system 150.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wrist-watch computer device, etc.); a laptop computer, a tablet computer, or another type of portable computer; a desktop computer; a set-top box or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may include an IoT device that communicates using machine-to-machine (M2M) communication, such as machine-type communication (MTC), a type of M2M communication standardized by the $3^{rd}$ Generation Partnership Project (3GPP), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

UE device 110 may be associated with a particular mobility category. As an example, if UE device 110 corresponds to a stationary device, such as an IoT device that is installed in a particular location, UE device 110 may be associated with a stationary mobility category. As another example, if UE device 110 corresponds to a low mobility device, such as a tracking device for walking, riding a bicycle, or a dog, UE device 110 may be associated with a low mobility category. As yet another example, if UE device 110 corresponds to a high mobility device, such as a vehicle or an aerial drone, UE device 110 may be associated with a high mobility category. As yet another example, if UE device 110 corresponds to a device with variable mobility, such as a smart phone, UE device 110 may be associated with a variable mobility.

Access network 120 may provide access to provider network 140 for UE devices 110. Access network 120 may enable UE device 110 to connect to provider network 140 for mobile telephone service, Short Message Service (SMS) message service, Multimedia Message Service (MIMS) message service, Internet access, cloud computing, and/or other types of data services.

Access network 120 may establish or may be incorporated into a packet data network connection between UE device 110 and provider network 140 via one or more Access Point Names (APNs). For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140, such as, for example, Data over Non-Access Stratum (DoNAS).

In some implementations, access network 120 may include a 4G Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UE devices 110. For example, base station 130-A may service UE devices 110-AA to 110-AX, etc., to base station 130-N, which may service UE devices 110-NA to 110-NY. In other words, UE devices 110-AA to 110-AX may be located within the geographic area serviced by base station 130-A, and other UE devices 110 may be serviced by another base station 130. Base station 130 may include a 5G base station (e.g., a gNodeB) that includes one or more radio frequency (RF) transceivers (also referred herein to as "base station cells" and/or "base station sectors") facing particular directions and providing coverage for particular geographic areas. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 130 may also include a 4G base station (e.g., an eNodeB).

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Provisioning system 150 may include one or more devices, such as computer devices and/or server devices, which provision services in access network 120 and/or provider network 140. Provisioning system 150 may configure particular network devices for particular services, may generate instructions to dispatch a technician to configure a particular service, and/or may provision UE device 110. For example, provisioning system 150 may instruct access network 120 to generate a new subscriber profile for UE device 110 and may instruct access network 120 to associate a particular mobility category with UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
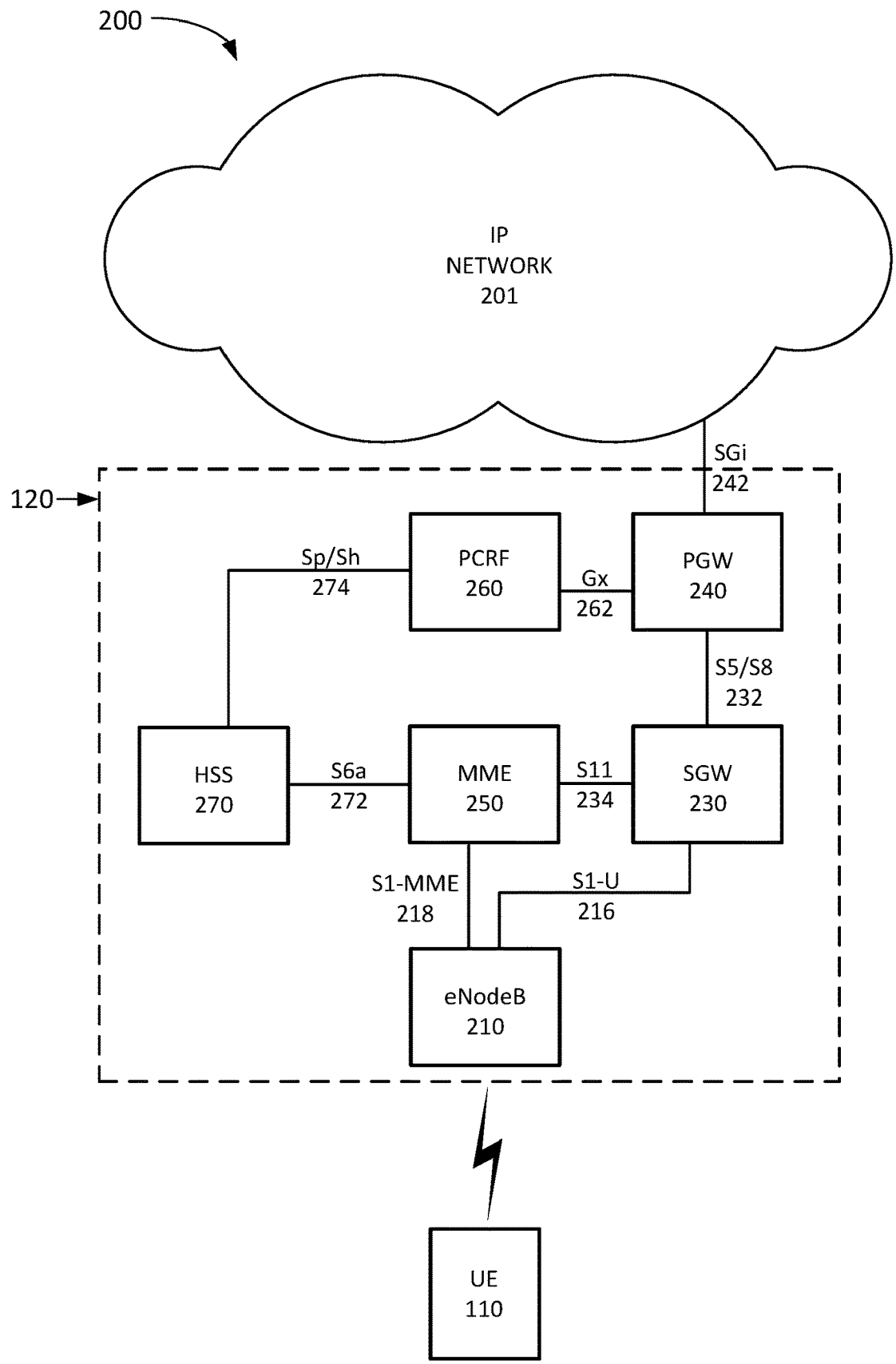
FIG. 2 is a diagram illustrating exemplary components of a Fourth Generation (4G) access network corresponding to the access network of FIG. 1 according to an implementation described herein.

FIG. 2 is a diagram illustrating a system 200 that includes exemplary components of access network 120 in an implementation that includes a 4G LTE access network according to an implementation described herein. As shown in FIG. 2, system 200 may include UE device 110, access network 120, and an IP network 201. IP network 201 may correspond to, or be included in, provider network 140. As shown in FIG. 2, access network 120 may include eNodeB 210, a Serving Gateway (SGW) 230, a Packet Data Network (PDN) Gateway (PGW) 240, a Mobility Management Entity (MME) 250, a Policy and Charging Rules Function (PCRF) device 260, and Home Subscriber Server (HSS) 270. While FIG. 2 depicts a single eNodeB 210, a single SGW 230, a single PGW 240, a single MME 250, a single PCRF device 260, and a single HSS 270, for illustration purposes, in practice, access network 120 may include multiple eNodeBs 210, multiple SGW 230, multiple PGW 240, multiple MME 250, multiple PCRF device 260, and/or multiple HSS 270.

eNodeB 210 may correspond to 4G base station 130. eNodeB 210 may communicate with UE device 110 using a 4G LTE air interface referred to as an Evolved Universal Mobile Telecommunications System (UMTS) Terrestrial Radio Access Network (E-UTRA) interface 212. eNodeB 210 may interface with access network 120 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using GTPv2.

SGW 230 may provide an access point to and from UE device 110, may handle forwarding of data packets for UE device 110, and may act as a local anchor point during handover procedures between different eNodeBs 210. SGW 230 may interface with PGW 240 through an S5/S8 interface 232. S5/S8 interface 232 may be implemented, for example, using GTPv2. PGW 240 may function as a gateway to IP network 201 through an SGi interface 242. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 250 may implement control plane processing for access network 120. For example, MME 250 may manage the mobility of UE device, implement tracking and paging procedures for UE device 110, activate and deactivate bearers for UE device 110, authenticate a user of UE device 110, and/or interface to non-LTE radio access networks. A bearer may represent a logical channel with particular quality of service (QoS) requirements. MME 250 may also select a particular SGW 230 for a particular UE device 110. A particular MME 250 may interface with other MMEs 250 (not shown in FIG. 2) in access network 120 and may send and/or receive information associated with UE devices 110, which may allow one MME 250 to take over control plane processing of UE devices 110 serviced by another MME 250, if the other MME 250 becomes unavailable. Furthermore, MME 250 may manage non-IP communication with UE device 110 using NAS. MME 250 may page UE device 110 based on mobility category information associated with UE device 110 obtained from HSS 270.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230).

PCRF device 260 may implement policy and charging rules functions, such as establishing Quality of Service (QoS) requirements, setting allowed bandwidth and/or data throughput limits for particular bearers and/or UE devices 110, determining charges for a particular service for a UE device 110, and/or other types of policy or charging rules. PCRF device 260 may communicate with PGW 240 through a Gx interface 262. Gx interface 262 may be implemented, for example, using Diameter protocol.

HSS 270 may store subscription information associated with UE devices 110 and/or information associated with users of UE devices 110. For example, HSS 270 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. Furthermore, the subscription profile may include mobility category information associated with UE device 110. HSS 270 may communicate with MME 250 through an S6a interface 272. S6a interface 272 may be implemented, for example, using a Diameter protocol. HSS 270 may communicate with PCRF device 260 using an Sp/Sh interface 274.

Although FIG. 2 shows exemplary components of access network 120, in other implementations, access network 120 may include fewer components, different components, differently arranged components, or additional components than depicted in FIG. 2. Additionally, or alternatively, one or more components of access network 120 may perform functions described as being performed by one or more other components of access network 120.

Figure 3:
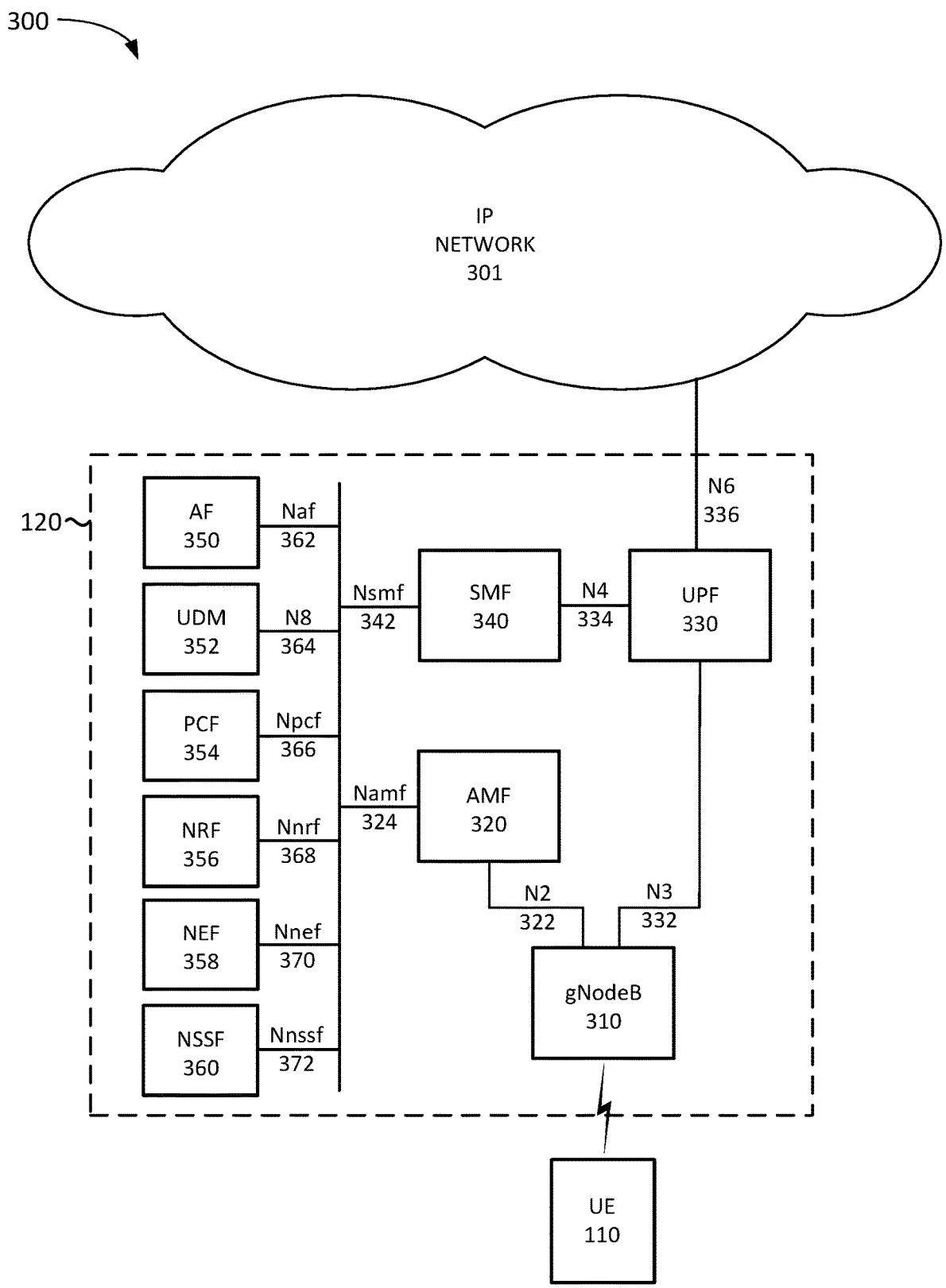
FIG. 3 is a diagram illustrating exemplary components of a Fifth Generation (5G) access network corresponding to the access network of FIG. 1 according to an implementation described herein.

FIG. 3 is a diagram illustrating a system 300 that includes exemplary components of access network 120 in an implementation that includes a 5G NR access network according to an implementation described herein. As shown in FIG. 3, system 300 may include UE device 110, access network 120, and an IP network 301. IP network 301 may correspond to, or be included in, provider network 140.

Access network 120 may include a gNodeB 310 (corresponding to base station 130), an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, a Network Slice Selection Function (NSSF) 360, and an enhanced MBMS gateway (eMBMS GW) 370. While FIG. 3 depicts a single gNodeB 310, AMF 320, UPF 330, SMF 340, AF 350, UDM 352, PCF 354, NRF 356, NEF 358, and/or NSSF 360 for illustration purposes, in practice, FIG. 3 may include multiple gNodeBs 310, AMFs 320, UPFs 330, SMFs 340, AFs 350, UDMs 352, PCFs 354, NRFs 356, NEFs 358, and/or NSSFs 360.

gNodeB 310 may include one or more devices (e.g., base stations) and other components and functionality that enable UE device 110 to wirelessly connect to access network 120 using 5G NR Radio Access Technology (RAT). For example, gNodeB 310 may include one or more cells, with each cell including a wireless transceiver with an antenna array configured for mm-wave wireless communication. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE device 110 and an SMS function (not shown in FIG. 3), session management messages transport between UE device 110 and SMF 340, access authentication and authorization, location services management, functionality to support non-3GPP access networks, and/or other types of management processes. AMF 320 may page UE device 110 based on mobility category information associated with UE device 110 obtained from UDM 352. In some implementations, AMF 320 may implement some or all of the functionality of managing RAN slices in gNodeB 310. AMF 320 may be accessible by other function nodes via an Namf interface 324.

UPF 330 may maintain an anchor point for intra/inter-RAT mobility, maintain an external Packet Data Unit (PDU) point of interconnect to a data network (e.g., IP network 301, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to IP network 301 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate charging data collection, termination of session management parts of NAS messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via an Naf interface 362.

UDM 352 may maintain subscription information for UE devices 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. For example, UDM 352 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. Furthermore, the subscription profile may include mobility category information associated with UE device 110. UDM 352 may be accessible via an N8 interface 364.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 366.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities and events to other NFs, including $3^{rd}$ party NFs, AFs, edge computing NFs, and/or other types of NFs. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE device 110, determine network slice selection assistance information (NSSAI), determine a particular AMF 320 to serve a particular UE device 110, and/or perform other types of processes associated with network slice selection or management. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
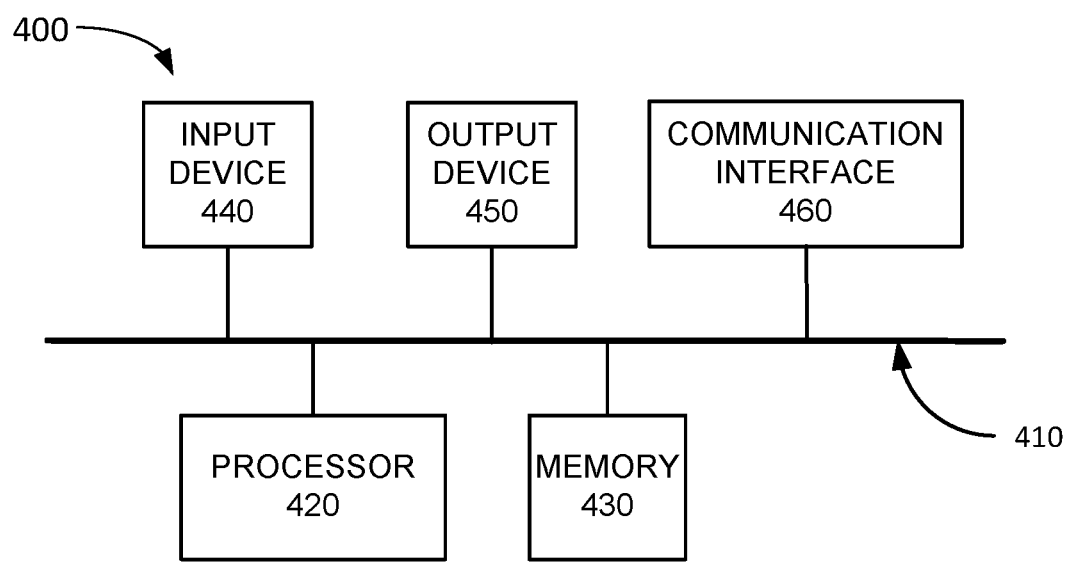
FIG. 4 is a diagram illustrating exemplary components of a device that may be included in a component of FIG. 1, FIG. 2, and/or FIG. 3 according to an implementation described herein.

FIG. 4 is a diagram illustrating example components of a device 400 according to an implementation described herein. UE device 110, eNodeB 210, SGW 230, PGW 240, MME 250, PCRF device 260, HSS 270, gNodeB 310, AMF 320, UPF 330, SMF 340, AF 350, UDM 352, PCF 354, NRF 356, NEF 358, NSSF 360, other components of access network 120, and/or provisioning system 150 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, when implemented as part of a 4G/5G network, device 400 may perform certain operations relating to paging of UE devices 110 based on mobility categories. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
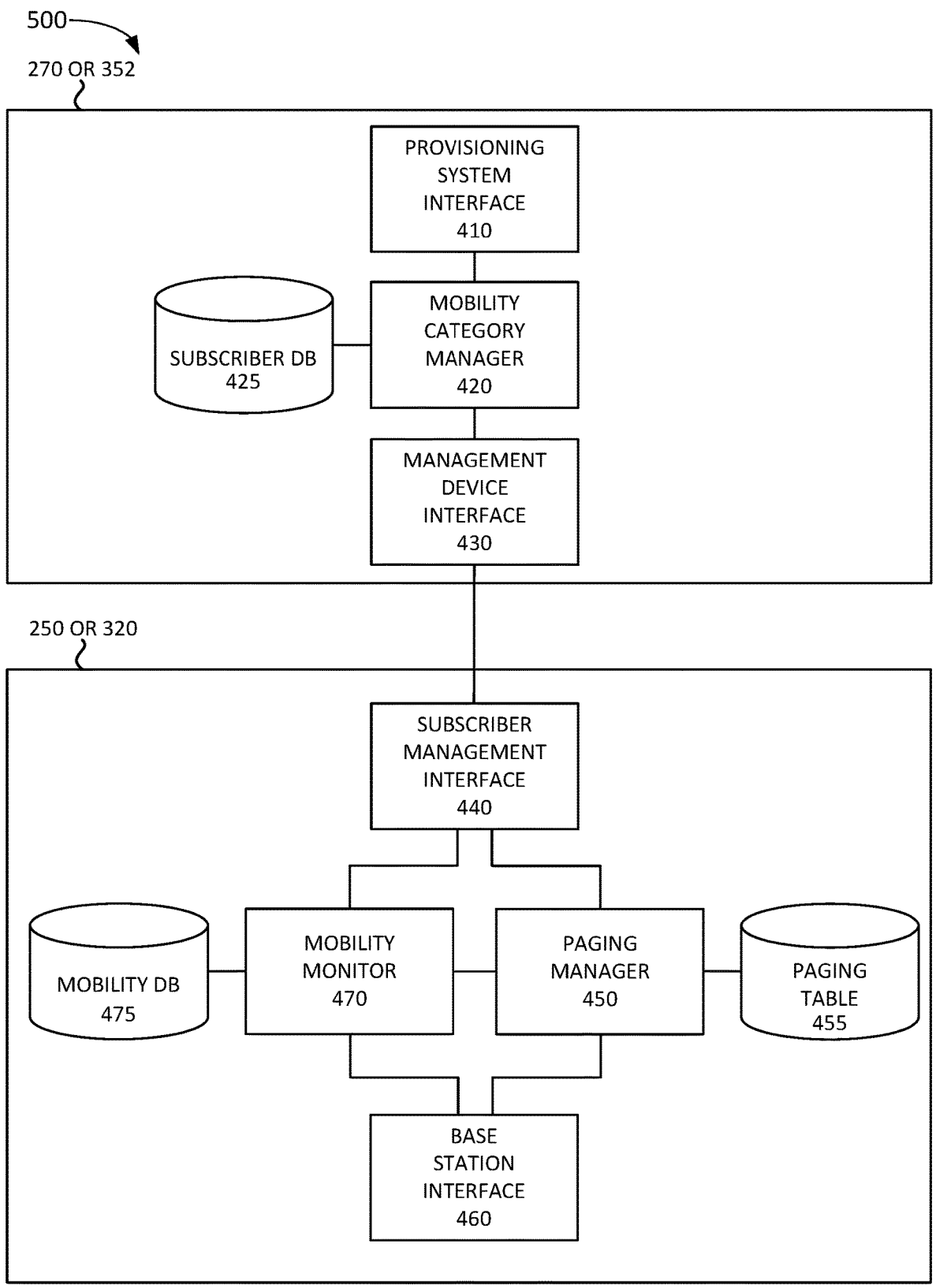
FIG. 5 is a diagram illustrating a system that includes exemplary functional components of a Home Subscriber Server (HSS) or a Unified Data Management (UDM) device and a Mobility Management Entity (MME) or an Access and Mobility Management Function (AMF) device according to an implementation described herein.

FIG. 5 is a diagram illustrating a system 500 that includes exemplary functional components of HSS 270 or UDM 352 and MME 250 or AMF 320. The functional components of HSS 270 or UDM 352 and MME 250 or AMF 320 may be implemented, for example, via processor 420 executing instructions from memory 430. Alternatively, some or all of the functional components of HSS 270 or UDM 352 and MME 250 or AMF 320 may be implemented via hard-wired circuitry. As shown in FIG. 5, HSS 270 or UDM 352 may include a provisioning system interface 410, a mobility category manager 420, a subscriber database (DB) 425, and a management device interface 430. As further shown in FIG. 5, MME 250 or AMF 320 may include a subscriber management interface 440, a paging manager 450, a paging table 455, a base station interface 460, a mobility monitor 470, and a mobility DB 475.

Provisioning system interface 410 may be configured to communicate with provisioning system 150. For example, provisioning system interface 410 may receive an instruction from provisioning system 150 to generate a new subscriber profile for UE device 110. Furthermore, provisioning system interface 410 may receive information identifying a mobility category associated with UE device 110 from provisioning system 150.

Mobility category manager 420 may store information identifying the mobility category in the subscriber profile associated with UE device 110 in subscriber DB 425. Subscriber DB 425 may store subscriber profiles for UE devices 110. Mobility category manager 420 may process requests for mobility category information received from MME 250 or AMF 320 via management device interface 430. Management device interface 430 may be configured to communicate with a management device in access network 120, such as MME 250 or AMF 320. Mobility category manager 420 may access subscriber DB 425 to retrieve information identifying a mobility category associated with UE device 110 and may provide the information identifying the mobility category to MME 250 or AMF 320 via management device interface 430.

When a UE device 110 first powers up or enters a new coverage area, UE device 110 may perform a network attach procedure with MME 250 or AMF 320. Subscriber management interface 440 may be configured to communicate with HSS 270 or UDM 352 to obtain subscriber profile information for UE device 110. In some implementations, the subscriber profile information, obtained during the attach procedure, may include information identifying the subscriber's assigned mobility category. In other implementations, paging manager 450, which manages paging of UE devices 110, may obtain the mobility category information for UE device 110 during a paging procedure. For example, paging manager 450 may detect a triggering condition to page UE device 110 and may, in response, request mobility category information from a subscriber profile management device, such as HSS 270 or UDM 352, via subscriber management interface 440. Paging manager 450 may then access paging table 455 to determine to how many base station cells to send a paging message based on the mobility category associated with UE device 110. Exemplary information that may be stored in paging table 455 is described below with reference to FIG. 6.

Base station interface 460 may be configured to communicate with base station 130 (e.g., eNodeB 210 and/or gNodeB 310). For example, base station interface 460 may keep track of the last known base station cell for each UE device 110 associated with MME 250 or AMF 320. Furthermore, base station interface 460 may keep track of the neighbor lists for base station 130 and may thus be able to determine base station cells around a particular base station cell and/or within a particular diameter of the particular base station cell. Thus, if paging manager 450 instructs base station interface 460 to page X number of base station cells around, and including, the last known base station cell for UE device 110, base station interface 460 may select the particular base station cells to which to send a paging message based on the instruction received from paging manager 450.

Mobility monitor 470 may monitor the mobility of UE devices 110. For example, mobility monitor 470 may obtain information identifying a mobility category associated with UE device 110 from HSS 270 or UDM 352 and store the information identifying the mobility category associated with UE device 110 in mobility DB 475. Furthermore, mobility monitor 470 may determine which base station sector coverage area UE device 110 is located in at a particular time based on with which base station sector UE device 110 is communicating. Mobility monitor 470 may track with which base station sector UE device 110 is communicating over time, determine a mobility index based on the tracked information, and may store the determined mobility index in mobility DB 475. Mobility monitor 470 may further compare the mobility index associated with UE device 110 with the mobility category associated with UE device 110 and may generate an alert of the mobility index does not match the mobility category for UE device 110.

Although FIG. 5 shows exemplary functional components of HSS 270 or UDM 352 and MME 250 or AMF 320, in other implementations, HSS 270 or UDM 352 and MME 250 or AMF 320 may include fewer functional components, different functional components, differently arranged functional components, or additional functional components than depicted in FIG. 5. Additionally, or alternatively, one or more functional components of HSS 270 or UDM 352 and MME 250 or AMF 320 may perform functions described as being performed by one or more other functional components of HSS 270 or UDM 352 and MME 250 or AMF 320. For example, some or all of the functionality described with respect to FIG. 5 may be implemented by another component of access network 120.

FIG. 6 is a diagram illustrating exemplary components of paging table 455 according to an implementation described herein. As shown in FIG. 6, paging table 455 may include a mobility category column 610, a description column 620, and a number of cells to page column 630.

Mobility category column 610 may include mobility category entries, with each entry specifying a particular mobility category. Description column 620 may include description entries, with each entry including a description of a particular mobility category. Number of cells to page column 630 may include number of cells to page entries, with each entry including information specifying the number of base station cells to page for UE devices associated with a particular mobility category.

For example, paging table 455 may include a first mobility category (MC-1) for stationary UE devices 110, for which the paging policy is to page only the last known base station cell; a second mobility category (MC-2) for high mobility UE devices 110, for which the paging policy is to page X number of cells around the last known cell; a third mobility category (MC-3) for low mobility UE devices 110, for which the paging policy is to page Y number of cells around the last known cells, where Y<X; and a fourth mobility category (MC-4) for UE devices 110 with a variable mobility, for which the paging policy is to use a standard paging procedure. The standard paging procedure may include, for example, sending a paging message to all base station cells in the tracking area of UE device 110.

Although FIG. 6 shows exemplary functional components of paging table 455, in other implementations, paging table 455 may include fewer functional components, different functional components, differently arranged functional components, or additional functional components than depicted in FIG. 6.

Figure 7:
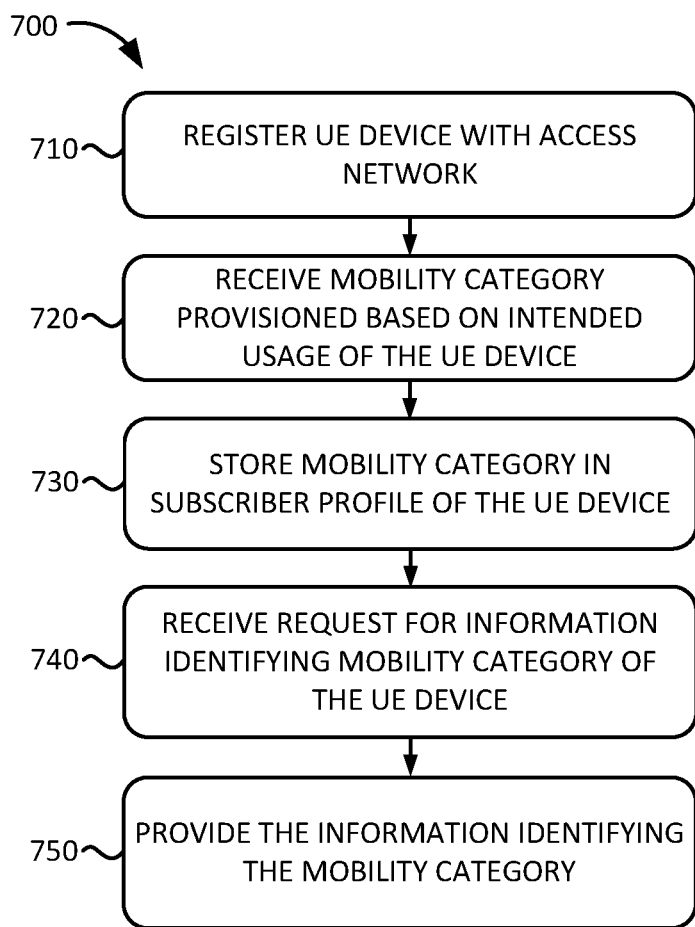
FIG. 7 is a flowchart of a process for registering a user equipment (UE) device according to an implementation described herein.

FIG. 7 is a flowchart of a process for registering UE device 110 according to an implementation described herein. In some implementations, the process of FIG. 7 may be performed by HSS 270 or UDM 352. In other implementations, some or all of the process of FIG. 7 may be performed by another device or a group of devices separate from HSS 270 or UDM 352.

The process of FIG. 7 may include registering a UE device with an access network (block 710), receiving a mobility category provisioned based on an intended usage of the UE device (block 720), and storing the received mobility category in the subscriber profile of the UE device (block 730). For example, HSS 270 or UDM 352 may receive an instruction from provisioning system 150 to generate a new subscriber profile for UE device 110. Furthermore, HSS 270 or UDM 352 may receive information identifying a mobility category associated with UE device 110 from provisioning system 150 and may store the information identifying the mobility category in the subscriber profile associated with UE device 110.

The process of FIG. 7 may further include receiving a request for information identifying a mobility category of the UE device (block 740) and providing the information identifying the mobility category (block 750). In some implementations, HSS 270 or UDM 352 may provide the information identifying the mobility category for UE device 110 to MME 250 or AMF 320 during an attach procedure. For example, HSS 270 or UDM 352 may receive a request for a subscriber profile for UE device 110 from MME 250 or AMF 320 during an attach procedure and may provide the requested subscriber profile for UE device 110 to MME 250 or AMF 320. The obtained subscriber profile may include information identifying the mobility category assigned to UE device 110.

In other implementations, HSS 270 or UDM 352 may provide the information identifying the mobility category for UE device 110 to MME 250 or AMF 320 during a paging procedure. For example, HSS 270 or UDM 352 may receive a request from MME 250 or AMF 320 for mobility category information for a particular UE device 110, may retrieve the mobility category information from a subscriber profile associated with the particular UE device 110, and may send the retrieved mobility category information to the requesting MME 250 or AMF 320.

Figure 8:
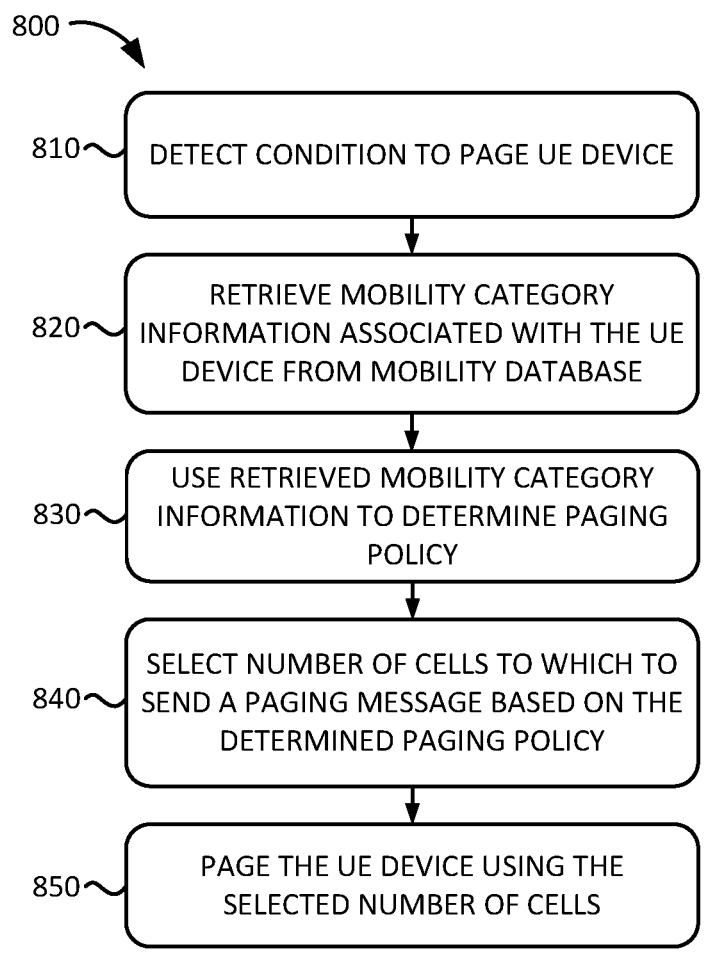
FIG. 8 is a flowchart of a process for paging a UE device according to an implementation described herein.

FIG. 8 is a flowchart of a process for paging UE device 110 according to an implementation described herein. In some implementations, the process of FIG. 8 may be performed by MME 250 or AMF 320. In other implementations, some or all of the process of FIG. 8 may be performed by another device or a group of devices separate from MME 250 or AMF 320.

The process of FIG. 8 may include detecting a condition to page a UE device (block 810). For example, paging manager 450 may determine that UE device 110 needs to receive a message. Mobility category information associated with the UE device may be retrieved from a mobility DB and used to determine a paging policy (blocks 820 and 830). As an example, MME 250 or AMF 320 may obtain mobility category information from HSS 270 or UDM 352 via a subscriber profile received during an attach procedure. As another example, in response to detecting the condition to page UE device 110, MME 250 or AMF 320 may request mobility category information from HSS 270 or UDM 352 and HSS 270 or UDM 352 may respond with the requested mobility category information for UE device 110. The obtained mobility category information for UE device 110 may be stored in mobility DB 475. Paging manager 450 of MME 250 or AMF 320 may access mobility DB 475 to determine the stored mobility category associated with UE device 110, and may then access paging table 455 to determine the paging policy associated with the determined mobility category for UE device 110.

The number of cells to which to send a paging message may be selected based on the received mobility category information (block 840) and the UE device may be paged using the selected number of cells (block 850). For example, paging manager 450 may select the number of cells to page based on the determined paging policy from paging table 455 and may send a paging message to the number of base station cells identified by the paging policy in order to page UE device 110.

Figure 9:
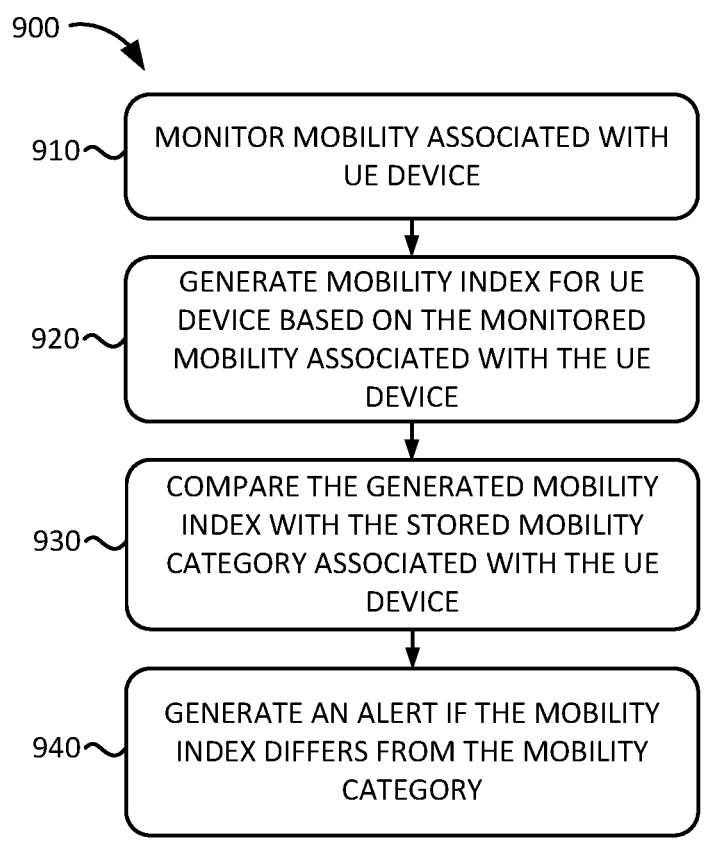
FIG. 9 is a flowchart of a process for monitoring the mobility of a UE device according to an implementation described herein.

FIG. 9 is a flowchart of a process for monitoring the mobility of UE device 110 according to an implementation described herein. In some implementations, the process of FIG. 9 may be performed by MME 250 or AMF 320. In other implementations, some or all of the process of FIG. 9 may be performed by another device or a group of devices separate from MME 250 or AMF 320.

The process of FIG. 9 may include monitor the mobility associated with a UE device (block 910) and a mobility index may be generated for the UE device based on the monitored mobility associated with the UE device (block 920). For example, mobility monitor 470 may keep track of which base station cell UE device 110 is communicating with over a particular time period and may calculate a mobility index based on the number of base station cells. For example, mobility monitor 470 may generate a numerical score based on the number of base station cells and may associate particular ranges of the numerical score with particular mobility index values. Mobility monitor 470 may store the determined mobility index in mobility DB 475.

The generated mobility index may be compared with the stored mobility category associated with the UE device (block 930) and an alert may be generated if the mobility index differs from the mobility category (block 940). For example, mobility monitor 470 may compare the mobility index generated for UE device 110 with the mobility category associated with UE device 110 and stored in mobility DB 475 and may generate an alert if the mobility index does not match the mobility category for the same UE device 110. For example, mobility monitor 470 may send an alert to provisioning system 150 and provisioning system 150 may store the alert in an alert DB for review by an administrator.

Furthermore, in some implementations, the tracked mobility may be used to fine-tune a paging policy for a particular UE device 110. For example, if, over period of time, the particular UE device 110 is determined to be associated with a particular set of base station cells, mobility monitor 470 may inform paging manager 450 which particular set of base station cells should be used to page the particular UE device 110. As an example, assume a low mobility category is associated with paging a last known cell and six cells surrounding the last known cell. However, mobility monitor 470 may determine that the particular UE device 110 is always within the service area of a particular base station cell or two adjacent base station cells Thus, instead of paging seven base station cells based on the low mobility category associated with the particular UE device 110, paging manager 450 may select to page only the three base station cells associated with the particular UE device 110 based on the mobility history of the particular UE device 110.

Moreover, in some implementations, the mobility category associated with UE device 110 may be automatically adjusted based on actual historical mobility index data. For example, if the generated mobility index for UE device 110 differs from the mobility category for the UE device 110 more than a threshold amount of time or instances, or for a particular portion of operating time, the mobility category may be automatically updated based on the mobility index.

Figure 10:
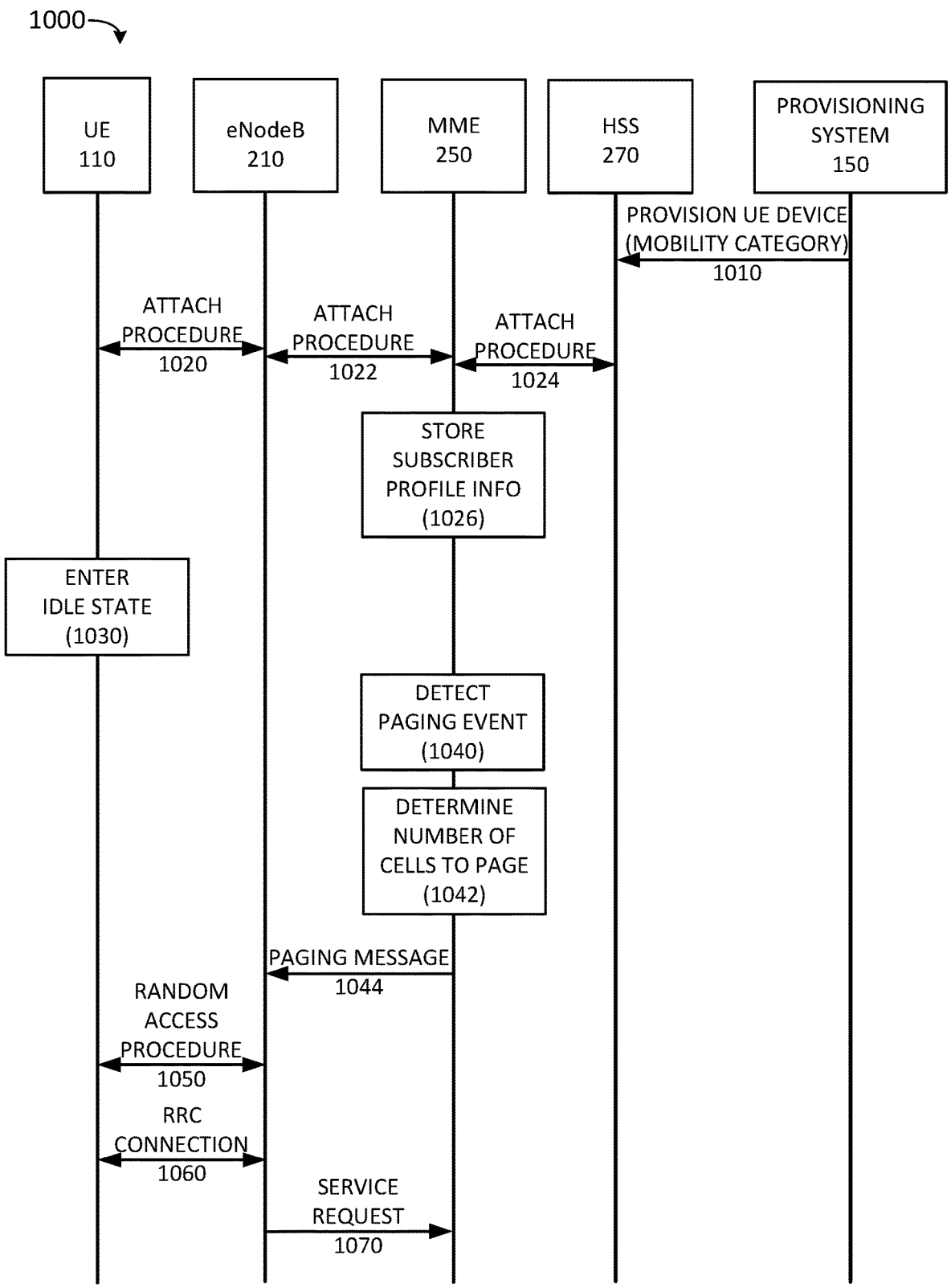
FIG. 10 is a diagram of an exemplary signal flow according to an implementation described herein.

FIG. 10 is a diagram of an exemplary signal flow 1000 according to an implementation described herein that includes a 4G LTE wireless access network. As shown in FIG. 10, signal flow 1000 may include provisioning system 150 provisioning UE device 110 with HSS 270 (signal 1010). The provisioning message may include information identifying the mobility category for UE device 110. HSS 270 may generate a subscriber profile for UE device 110 and may store the mobility category information in the generated subscriber profile.

UE device 110 may then attach to access network 120 via eNodeB 210 (signals 1020, 1022, and 1024). During the attach procedure, MME 250 may receive UE subscriber profile information for UE device 110 from HSS 270 and store the received subscriber profile information (block 1026). The UE profile information received from HSS 270 may include information identifying the mobility category associated with UE device 110. The information identifying the mobility category associated with UE device 110 may be stored by MME 250 in mobility DB 475.

At a later time, UE device 110 may enter an idle state (block 1030). Later still, MME 250 may detect a paging event (block 1040). For example, MME 250 may determine that a message or a data delivery is available for UE device 110. MME 250 may select to send a paging message to UE device 110.

In response to selecting to send the paging message to UE device 110, MME 250 may use the mobility category information for UE device 110, which was previously received from HSS 270 during the attach procedure, to determine the number of cells to page (block 1042), by accessing paging table 455. Assume UE device 110 corresponds to a stationary IoT device, such as a utility meter. MME 250 may determine, based on the mobility category information received from HSS 270, that UE device 110 is associated with a stationary mobility category and may determine that a paging message should only be sent to the last known base station cell associated with UE device 110. Thus, MME 250 may only send a paging message to eNodeB 210 (signal 1044).

UE device 110 may detect the paging message transmitted by eNodeB 210 and may exit the idle state and perform a random access procedure and establish a Radio Resource Control (RRC) connection with eNodeB 210 (signals 1050 and 1060). UE device 110 may then respond to the paging message by sending a service request to MME 250 to perform the update (signal 1070).

Figure 11:
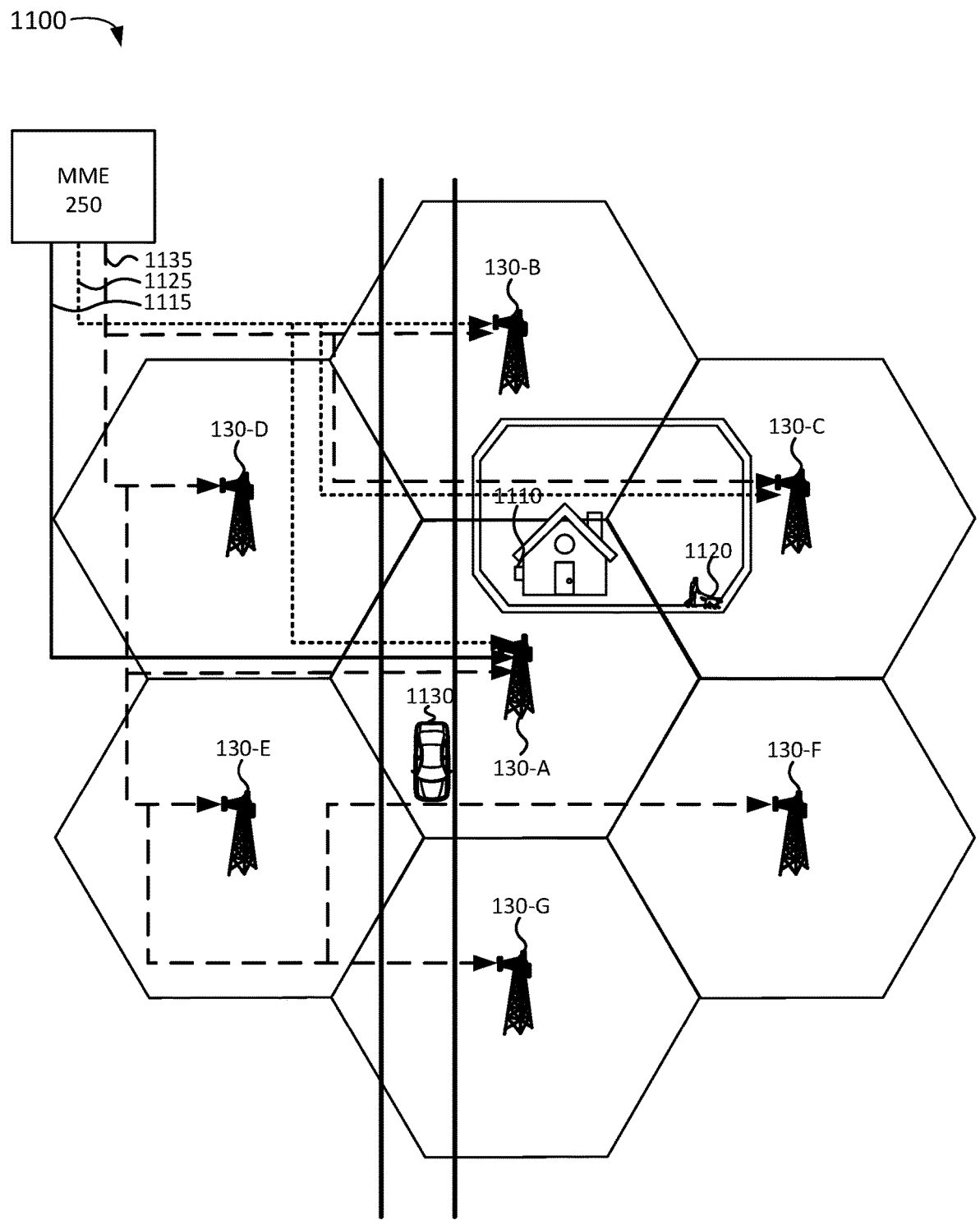
FIG. 11 is a diagram of an exemplary paging procedure for a group of different UE devices (UEs) according an implementation described herein.

FIG. 11 is a diagram of an exemplary paging procedure scenario 1100 for a group of different UE devices 110 according to an implementation described herein. As shown in FIG. 11, paging procedure scenario 1100 may include MME 250, base stations 130-A, 130-B, 130-C, 130-D, 130-E, 130-F, and 130-G, a utility meter device 1110, a dog collar tracking device 1120, and a vehicle 1130 with LTE wireless communication functionality. Utility meter device 1110 may be associated with a stationary mobility category, dog collar tracking device 1120 may be associated with a low mobility category, and vehicle 1130 may be associated with a high mobility.

When paging utility meter device 1110, MME 250 may, based on the stationary mobility category associated with utility meter device 1110, send a paging message 1115 only to base station 130-A. When paging dog collar tracking device 1120, MME 250 may, based on the low mobility category associated with dog collar tracking device 1120, send a paging message 1125 to base stations 130-A, 130-B, and 130-C. When paging vehicle 1130, MME 250 may, based on the high mobility category associated with vehicle 1130, send a paging message 1135 to base stations 130-A, 130-B, 130-C, 130-D, 130-E, 130-F, and 130-G. Thus, using the mobility category to determine how many base stations 130 to page for each UE device 110 may conserver the resources of access network 120 and result in a more efficient paging mechanism.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7, 8, and 9, and a series of signals with respect to FIG. 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    detecting, by a computer device, a condition to page a user equipment (UE) device;
    retrieving, by the computer device, mobility category information associated with the UE device from a mobility database;
    using, by the computer device, the retrieved mobility category information to determine a paging policy;
    selecting, by the computer device, a number of base station cells to which the computer device is to send a paging message based on the determined paging policy, wherein selecting the number of base station cells to which the computer device is to send a paging message includes:
        selecting to page a first number of base station cells around a last known base station cell servicing the UE device, when the mobility category information identifies the UE device as belonging to a low mobility category; and selecting to page a second number of base station cells around the last known base station cell servicing the UE device, wherein the second number is higher than the first number, when the mobility category information identifies the UE device as belonging to a high mobility category; and paging, by the computer device, the UE device using the selected number of base station cells.

2. The method of claim 1, further comprising:
storing a paging table that includes paging policies for particular mobility categories.

3. The method of claim 1, further comprising:
registering the UE device with a subscriber profile management device;
receiving information identifying a mobility category based on an intended usage of the UE device;
storing the received information identifying the mobility category in a subscriber profile associated with the UE device; and
providing the information identifying the mobility category to the computer device.

4. The method of claim 3, wherein the computer device includes a Mobility Management Entity (MME) device and wherein the subscriber profile management device includes a Home Subscriber Server (HSS) device.

5. The method of claim 3, wherein the computer device includes an Access and Mobility Management Function (AMF) device and wherein the subscriber profile management device includes a Unified Data Management (UDM) device.

6. The method of claim 1, wherein the mobility category information identifies the UE device as belonging to a stationary mobility category, and wherein selecting the number of base station cells to which to send a paging message based on the received mobility category information further includes:
selecting to page only a last known base station cell servicing the UE device, when the mobility category information identifies the UE device as belonging to the stationary mobility category.

7. The method of claim 1, wherein selecting the number of base station cells to which to send the paging message based on the received mobility category information includes:
identifying the UE device as belonging to the low mobility category based on the retrieved mobility category information.

8. The method of claim 1, wherein selecting the number of base station cells to which to send the paging message based on the received mobility category information includes:
identifying the UE device as belonging to the high mobility category based on the retrieved mobility category information.

9. The method of claim 1, further comprising:
monitoring a mobility associated with the UE device;
generating a mobility index for the UE device based on the monitored mobility;
comparing the generated mobility index to a mobility category associated with the UE device based on the mobility category information associated with the UE device in the mobility database; and
generating an alert if the mobility index differs from the mobility category.

10. A computer device comprising:
a memory storing instructions; and
processor configured to execute the instructions to:
detect a condition to page a user equipment (UE) device;
retrieve mobility category information associated with the UE device from a mobility database;
use the retrieved mobility category information to determine a paging policy;
select a number of base station cells to which the computer device is to send a paging message based on the determined paging policy, wherein, when selecting the number of base station cells to which the computer device is to send a paging message, the processor is further configured to:
select to page a first number of base station cells around a last known base station cell servicing the UE device, when the mobility category information identifies the UE device as belonging to a low mobility category; and
select to page a second number of base station cells around the last known base station cell servicing the UE device, wherein the second number is higher than the first number, when the mobility category information identifies the UE device as belonging to a high mobility category; and
page the UE device using the selected number of base station cells.

11. The computer device of claim 10, wherein the processor is further configured to:
store a paging table that includes paging policies for particular mobility categories.

12. The computer device of claim 10, wherein the processor is further configured to:
obtain the mobility category information from a subscriber profile management device.

13. The computer device of claim 12, wherein the computer device includes a Mobility Management Entity (MME) device and wherein the subscriber profile management device includes a Home Subscriber Server (HSS) device.

14. The computer device of claim 12, wherein the computer device includes an Access and Mobility Management Function (AMF) device and wherein the subscriber profile management device includes a Unified Data Management (UDM) device.

15. The computer device of claim 10, wherein the mobility category information identifies the UE device as belonging to a stationary mobility category, and wherein, when selecting the number of base station cells to which to send a paging message based on the received mobility category information, the processor is further configured to:
select to page only a last known base station cell servicing the UE device, when the mobility category information identifies the UE device as belonging to the stationary mobility category.

16. The computer device of claim 10, wherein, when selecting the number of base station cells to which to send the paging message based on the received mobility category information, the processor is further configured to:
identify the UE device as belonging to the low mobility category based on the retrieved mobility category information.

17. The computer device of claim 10, wherein, when selecting the number of base station cells to which to send the paging message based on the received mobility category information, the processor is further configured to:
identify the UE device as belonging to the high mobility category based on the retrieved mobility category information.

18. The computer device of claim 10, wherein the processor is further configured to:
- monitor a mobility associated with the UE device;
- generate a mobility index for the UE device based on the monitored mobility;
- compare the generated mobility index to a mobility category associated with the UE device based on the received mobility category information associated with the UE device in the mobility database; and
- generate an alert if the mobility index differs from the mobility category.

19. A system comprising:
a subscriber profile management device configured to:
- store a subscriber profile for a user equipment (UE) device, wherein the subscriber profile includes information identifying a mobility category based on an intended usage of the UE device; and a computer device configured to:
- obtain the mobility category information from the subscriber profile management device;
- detect a condition to page the UE device;
- retrieve mobility category information associated with the UE device from a mobility database;
- use the retrieved mobility category information to determine a paging policy;
- select a number of base station cells to which the computer device is to send a paging message based on the determined paging policy, wherein, when selecting the number of base station cells to which the computer device is to send a paging message, the computer device is further configured to:
  - select to page a first number of base station cells around a last known base station cell servicing the UE device, when the mobility category information identifies the UE device as belonging to a low mobility category; and
  - select to page a second number of base station cells around the last known base station cell servicing the UE device, wherein the second number is higher than the first number, when the mobility category information identifies the UE device as belonging to a high mobility category; and
- page the UE device using the selected number of base station cells.

20. The system of claim 19, wherein, the computer device is further configured to:
- select to page only a last known base station cell servicing the UE device, when the mobility category information identifies the UE device as belonging to a stationary mobility category;

or
- select to use a default paging procedure, when the mobility category information identifies the UE device as belonging to a variable mobility category.

* * * * *